(12) United States Patent
Fang et al.

(10) Patent No.: US 11,921,915 B2
(45) Date of Patent: Mar. 5, 2024

(54) HEAD-MOUNTED DISPLAY SYSTEM AND MANNED DEVICE

(71) Applicant: HANGZHOU LINGBAN TECHNOLOGY CO. LTD., Hangzhou (CN)

(72) Inventors: Guojun Fang, Hangzhou (CN); Zhenyu Zheng, Hangzhou (CN)

(73) Assignee: HANGZHOU LINGBAN TECHNOLOGY CO. LTD., Hangzhou (CN)

( * ) Notice: Subject to any disclaimer, the term of this patent is extended or adjusted under 35 U.S.C. 154(b) by 0 days.

(21) Appl. No.: 18/160,471

(22) Filed: Jan. 27, 2023

(65) Prior Publication Data

US 2023/0241974 A1 Aug. 3, 2023

(30) Foreign Application Priority Data

Jan. 29, 2022 (CN) .......................... 202210111781.6

(51) Int. Cl.
*G06F 3/01* (2006.01)
*G02B 27/01* (2006.01)

(52) U.S. Cl.
CPC .......... *G06F 3/011* (2013.01); *G02B 27/0172* (2013.01); *G09G 2380/10* (2013.01)

(58) Field of Classification Search
CPC .... B60K 2370/1438; B60K 2370/1529; B60K 35/00; B60K 2370/177; G06F 3/011;
(Continued)

(56) References Cited

U.S. PATENT DOCUMENTS 9,274,337 B2    3/2016  Meadows
2014/0253588 A1*  9/2014  Mandala ............. G02B 27/017
                                                          345/633
(Continued)

FOREIGN PATENT DOCUMENTS

CN    104850376 A    8/2015
CN    105243562 A    1/2016
(Continued)

OTHER PUBLICATIONS

CN202210111781.6—Dismissing decision dated Nov. 1, 2023, 12 pages.
(Continued)

*Primary Examiner* — Sanjiv D. Patel
(74) *Attorney, Agent, or Firm* — Getech Law LLC; Jun Ye

(57) ABSTRACT

Disclosed are a head-mounted display system and a manned device. The head-mounted display system comprises: a head-mounted display apparatus, a touch device and a manned terminal apparatus, wherein the touch device is arranged on the manned device and is in communication connection with the manned terminal apparatus, the manned terminal apparatus is arranged on the manned device and comprises a power supply module and a processor module, and the head-mounted display apparatus comprises at least one display screen, is in communication connection with the manned terminal apparatus, and is configured to execute a control operation corresponding to a touch operation performed on the touch device by a passenger user of the manned device. The head-mounted display system enables the passenger to watch the screen content without maintaining a certain posture for a long time, and improves the personalized experience and privacy experience of the passenger.

18 Claims, 10 Drawing Sheets

(58) Field of Classification Search
CPC ............... G06F 3/0488; G02B 27/017; G02B 2027/0178; G06T 19/006; G06V 20/20; G06V 40/19; G09G 2354/00; G09G 2380/10; A63F 2300/8082; A61B 2090/365; A61B 2090/502; B60R 16/037; B64C 39/02

See application file for complete search history.

(56) References Cited

U.S. PATENT DOCUMENTS

| | | | | |
|---|---|---|---|---|
| 2017/0249789 | A1* | 8/2017 | Mizuno | ............... G07C 5/0858 |
| 2019/0188912 | A1* | 6/2019 | Kamini | ................. G06F 3/017 |
| 2020/0371596 | A1* | 11/2020 | Lee | ....................... G06F 9/542 |

FOREIGN PATENT DOCUMENTS

| | | |
|---|---|---|
| CN | 207926930 U | 9/2018 |
| CN | 110352087 A | 10/2019 |
| CN | 112765376 A | 5/2021 |
| CN | 113534466 A | 10/2021 |

OTHER PUBLICATIONS

CN202210111781.6—Notice of Opinion for the first review dated Apr. 14, 2023, 15 pages.

\* cited by examiner

HEAD-MOUNTED DISPLAY SYSTEM AND MANNED DEVICE

TECHNICAL FIELD

Embodiments of the present disclosure relate to the technical field of computers, and in particular to a head-mounted display system and a manned device.

BACKGROUND

With the development of terminal technologies applied to manned devices, for example, a vehicle-mounted terminal technology, more and more manned devices are configured with display screens for passengers to watch. However, the above-mentioned method often has the following technical problems that, since the display screen is arranged at a fixed position of the manned device, a passenger needs to maintain a certain viewing posture for a long time when watching, for example, the passenger sitting on one side of the display screen needs to watch in a posture of turning his/her head sideways; also, the passenger watching the same display screen cannot optionally switch the display content of the display screen according to his/her own demands, causing the personalized experience of the passenger to be poor; moreover, sharing the display content of the display screen makes the privacy experience of the passenger poor.

In addition, a current augmented reality (AR) device/ mixed reality (MR) device based on a vehicle-mounted terminal is generally applied to a driver side so as to assist a driver in driving, and there are currently no AR/MR devices specifically designed for passengers.

SUMMARY

The summary of the present disclosure serves to concisely introduce concepts thereof, which will be further described below in particular embodiments. The summary of the present disclosure is not intended to illustrate key or essential features of claimed technical solutions, nor is it intended to limit the scope of the claimed technical solutions.

Some embodiments of the present disclosure provide head-mounted display systems and manned devices in order to solve one or more of the technical problems mentioned in the background above.

In a first aspect, some embodiments of the present disclosure provide a head-mounted display system for use in a manned device. The head-mounted display system comprises: a head-mounted display apparatus, a touch device and a manned terminal apparatus, wherein the touch device is arranged on the manned device and is in communication connection with the manned terminal apparatus, the manned terminal apparatus is arranged on the manned device and comprises a power supply module and a processor module, and the head-mounted display apparatus comprises at least one display screen; the head-mounted display apparatus is in communication connection with the manned terminal apparatus, and the head-mounted display apparatus is configured to execute a control operation corresponding to a touch operation performed on the touch device by a passenger user of the manned device.

Optionally, the manned terminal apparatus is configured to adjust, in response to detecting that the passenger user wears the head-mounted display apparatus, a manned seat associated with the head-mounted display apparatus to a preset inclination angle and/or to a preset horizontal displacement.

Optionally, the touch device is arranged on an armrest associated with the head-mounted display apparatus.

Optionally, a cavity is formed in the armrest, a rotating shaft is arranged in the cavity, the touch device is rotatably connected to the rotating shaft, and in an unused state, the touch device is rotatably arranged in the cavity by means of the rotating shaft.

Optionally, the manned terminal apparatus further comprises a display output interface, and the head-mounted display apparatus further comprises a display input interface corresponding to the display output interface.

Optionally, the manned terminal apparatus further comprises a network connection module.

Optionally, the head-mounted display apparatus further comprises a power supply unit.

Optionally, the manner of connection between the head-mounted display apparatus and the manned terminal apparatus is wireless connection for projection.

Optionally, the head-mounted display system further comprises a head-mounted display apparatus storage device, wherein the head-mounted display apparatus is placed in the head-mounted display apparatus storage device in an unused state.

Optionally, the head-mounted display system further comprises a head-mounted display apparatus anti-theft device.

Optionally, the head-mounted display apparatus anti-theft device comprises an alarm and a communication connection detection module, and the head-mounted display apparatus anti-theft device is in communication connection with the head-mounted display apparatus; the communication connection detection module is configured to activate the alarm in response to detecting that the head-mounted display apparatus anti-theft device is in communication disconnection with the head-mounted display apparatus.

Optionally, the head-mounted display apparatus further comprises a camera device; and the head-mounted display apparatus is further configured to identify at least one piece of manned device characteristic location information from a manned device image captured by the camera device, and configured to display, with regard to each piece of manned device characteristic location information in the at least one piece of manned device characteristic location information, manned device characteristic prompt message corresponding to the manned device characteristic location information, at the location corresponding to the manned device characteristic location information in a virtual space displayed by the at least one display screen.

Optionally, the head-mounted display system further comprises a human face camera device, wherein the human face camera device is configured to capture a human face image of the passenger user wearing the head-mounted display apparatus, and the head-mounted display apparatus is further configured to display the human face image captured by the human face camera device in the virtual space displayed by the at least one display screen.

Optionally, the head-mounted display system further comprises an audio capture device; the human face camera device is further configured to capture a human face video of the passenger user wearing the head-mounted display apparatus, and the audio capture device is configured to capture an audio corresponding to the human face video.

Optionally, the head-mounted display apparatus further comprises an audio playing device.

Optionally, the head-mounted display system further comprises an acceleration sensor; the head-mounted display apparatus is further configured to display, in response to the acceleration acquired by the acceleration sensor satisfying one of at least one acceleration prompt condition, an acceleration prompt message corresponding to the acceleration prompt condition in the virtual space displayed by the at least one display screen.

Optionally, the head-mounted display system further comprises a speed sensor; the head-mounted display apparatus is further configured to display, in response to the speed acquired by the speed sensor satisfying one of at least one speed prompt condition, a speed prompt message corresponding to the speed prompt condition in the virtual space displayed by the at least one display screen.

Optionally, the head-mounted display apparatus is further configured to display a user interaction interface of the manned terminal apparatus in the virtual space displayed by the at least one display screen.

Optionally, the head-mounted display system further comprises localization device that is configured to capture localization information.

Optionally, the head-mounted display apparatus is further configured to display road condition information and/or weather information corresponding to the localization information in the virtual space displayed by the at least one display screen.

Optionally, the head-mounted display apparatus is further configured to display travel recommendation information corresponding to the localization information in the virtual space displayed by the at least one display screen.

Optionally, the head-mounted display apparatus is further configured to display destination road condition information of a corresponding destination in the virtual space displayed by the at least one display screen.

Optionally, the head-mounted display apparatus is further configured to display multimedia information corresponding to the remaining riding time in the virtual space displayed by the at least one display screen.

Optionally, the head-mounted display apparatus is further configured to display, in response to detecting that an operating mode is an online mode, an online virtual interface in the virtual space displayed by the at least one display screen.

In a second aspect, some embodiments of the present disclosure provide a manned device. The manned device comprises a manned device main unit and a head-mounted display system as described in any one of the implementations in the first aspect.

Optionally, the manned device main unit further comprises a manned seat, and the touch device is arranged on the manned seat.

Optionally, the manned seat is a passenger seat, an armrest is arranged on one side of the passenger seat, and the touch device is arranged on the armrest.

Optionally, the passenger seat comprises a safety device, and the head-mounted display apparatus is configured to display, in response to detecting that the safety device of the passenger seat is in a standby state, a safety prompt message corresponding to the safety device in the virtual space displayed by at least one display screen of the head-mounted display apparatus.

Optionally, a gravity sensor is arranged below the passenger seat, and the manned terminal apparatus is configured to, in response to the gravity information detected by the gravity sensor, turn on the touch device and the head-mounted display apparatus.

The above-described embodiments of the present disclosure have the following beneficial effects that the head-mounted display system of some embodiments of the present disclosure allow the passenger to watch screen content without maintain a certain posture for a long time, and the personalized experience and privacy experience of the passengers are improved. Specifically, a passenger needs to maintain a certain viewing posture for a long time and the personalized experience and privacy experience of the passenger are poor due to the fact that: since the display screen is arranged at a fixed position of the manned device, the passenger needs to maintain a certain viewing posture for a long time when watching, for example, the passenger sitting on one side of the display screen needs to watch in a posture of turning his/her head sideways; also, the passenger watching the same display screen cannot optionally switch the display content of the display screen according to his/her own demands, causing the personalized experience of the passenger to be poor; moreover, sharing the display content of the display screen makes the privacy experience of the passenger poor. On this basis, the head-mounted display system of some embodiments of the present disclosure comprises a head-mounted display apparatus, a touch device and a manned terminal apparatus, wherein the touch device is arranged on the manned device and is in communication connection with the manned terminal apparatus. The manned terminal apparatus is arranged on the manned device, and comprises a power supply module and a processor module. The head-mounted display apparatus comprises at least one display screen. The head-mounted display apparatus is in communication connection with the manned terminal apparatus. The head-mounted display apparatus is configured to execute a control operation corresponding to a touch operation performed on the touch device by the passenger user of the manned device. Thus, the passenger can control the worn head-mounted display apparatus by himself/herself by means of the touch device, improving the personalized experience of the passenger. Also, since the head-mounted display apparatus comprises at least one display screen, the passenger can watch the display content directly by means of the head-mounted display apparatus, and accordingly can watch it without a display screen configured on the manned device. Furthermore, it is not required to maintain a certain viewing posture for a long time, and the privacy experience of the passenger is also improved. Thus, the passenger can watch the screen content without maintaining a certain posture for a long time, and the personalized experience and privacy experience of the passenger are improved.

BRIEF DESCRIPTION OF THE DRAWINGS

With reference to the following detailed description, the above-described and other features, advantages, and aspects of embodiments of the present disclosure will become clear in conjunction with the accompanying drawings. Throughout the drawings, the same or similar reference numerals indicate the same or similar elements. It should be understood that the drawings are schematic and that components and elements are not necessarily drawn to scale.

DETAILED DESCRIPTION OF THE EMBODIMENTS

Figure 1:
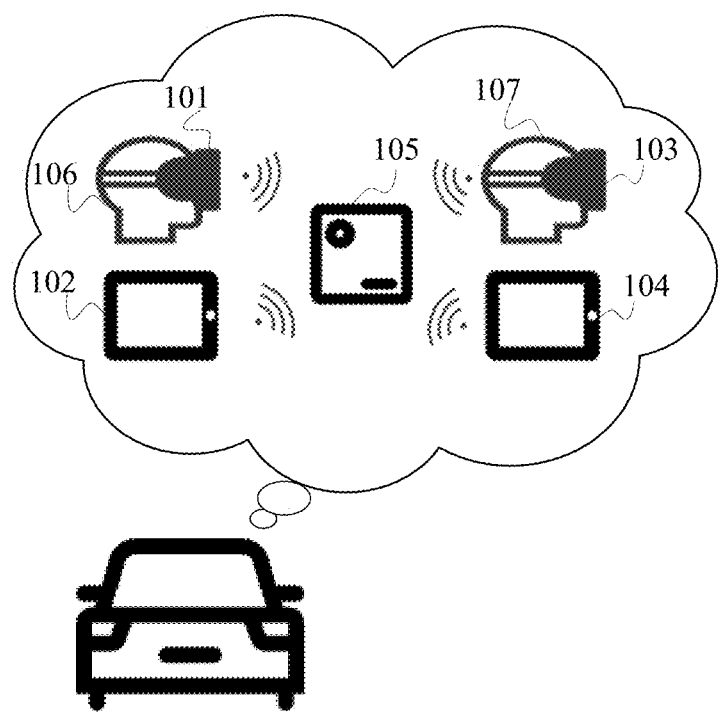
FIG. 1 is a schematic diagram of an application scenario for a head-mounted display system according to some embodiments of the present disclosure.

Embodiments of the present disclosure will be described in detail with reference to the accompanying drawings. Although some embodiments of the present disclosure are illustrated in the accompanying drawings, it should be understood that the present disclosure may be implemented in various forms and should not be construed as being limited to the embodiments elaborated herein. Rather, these embodiments are provided in order to thoroughly and completely understand the present disclosure. It should be understood that the drawings and embodiments of the present disclosure are merely for exemplary illustration, and are not intended to limit the scope of protection of the present disclosure.

It should further be understood that, for ease of description, only the parts that are relevant to the invention are shown in the drawings. The embodiments and features thereof in the present disclosure may be combined with each other without conflict.

It should be noted that the terms "first", "second", etc. mentioned in the present disclosure are merely used to distinguish different devices, modules, or units, and are not intended to limit the order or interdependence of functions to be performed by the devices, modules, or units.

It should be noted that the modifying words "a", "an", and "a plurality of" mentioned in the present disclosure are intended to be illustrative and not limiting, and those skilled in the art will understand that unless the context clearly indicates otherwise, the words should be interpreted as "one or more".

The names of messages or information that are interactive among a plurality of devices in the embodiments of the present disclosure are merely for illustrative purposes, and are not intended to limit the scope of such messages or information.

The present disclosure will now be described in detail in conjunction with the embodiments with reference to the accompanying drawings.

FIG. 1 is a schematic diagram of an application scenario for a head-mounted display system according to some embodiments of the present disclosure.

As shown in FIG. 1, the head-mounted display system includes a head-mounted display apparatus 101, a touch device 102, a head-mounted display apparatus 103, a touch device 104, and a manned terminal apparatus 105; wherein the touch device 102 and the touch device 104 are respectively arranged on the manned device and are in communication connection with the manned terminal apparatus 105, the manned terminal apparatus 105 is arranged on the manned device and includes a power supply module and a processor module, the head-mounted display apparatus 101 and the head-mounted display apparatus 103 each include at least one display screen, and the head-mounted display apparatus 101 and the head-mounted display apparatus 103 are respectively in communication connection with the manned terminal apparatus 105. A passenger user 106 wears the head-mounted display apparatus 101. A passenger user 107 wears the head-mounted display apparatus 103. The head-mounted display apparatus 101 is configured to execute a control operation corresponding to a touch operation performed on the touch device 102 by the passenger user 106 of the manned device. The head-mounted display apparatus 103 is configured to execute a control operation corresponding to a touch operation performed on the touch device 104 by the passenger user 107 of the manned device.

It should be understood that the numbers of the head-mounted display apparatuses, the touch devices and the manned terminal apparatuses in FIG. 1 are merely illustrative. Any number of head-mounted display apparatuses, any number of touch devices, and any number of manned terminal apparatuses may be provided according to implementation requirements.

Figure 2:
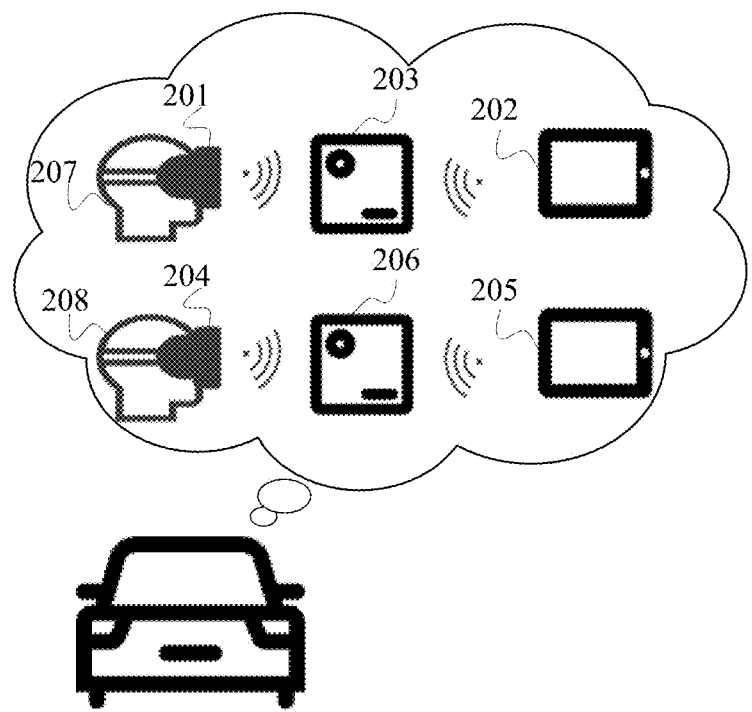
FIG. 2 is a schematic diagram of another application scenario for a head-mounted display system according to some embodiments of the present disclosure.

FIG. 2 is a schematic diagram of another application scenario for a head-mounted display system according to some embodiments of the present disclosure.

As shown in FIG. 2, the head-mounted display system includes a head-mounted display apparatus 201, a touch device 202, a manned terminal apparatus 203, a head-mounted display apparatus 204, a touch device 205, and a manned terminal apparatus 206; wherein the touch device 202 is arranged on the manned device and is in communication connection with the manned terminal apparatus 203, the touch device 205 is arranged on the manned device and is in communication connection with the manned terminal apparatus 206, the manned terminal apparatus 203 and the manned terminal apparatus 206 are both arranged on the manned device, and each include a power supply module and a processor module, the head-mounted display apparatus 201 and the head-mounted display apparatus 204 each include at least one display screen, the head-mounted display apparatus 201 is in communication connection with the manned terminal apparatus 203, and the head-mounted display apparatus 204 is in communication connection with the manned terminal apparatus 206. A passenger user 207 wears the head-mounted display apparatus 201. A passenger user 208 wears the head-mounted display apparatus 204. The head-mounted display apparatus 201 is configured to execute a control operation corresponding to a touch operation performed on the touch device 202 by the passenger user 207 of the manned device. The head-mounted display apparatus 204 is configured to execute a control operation corresponding to a touch operation performed on the touch device 205 by the passenger user 208 of the manned device.

It should be understood that the numbers of the head-mounted display apparatuses, the touch devices and the manned terminal apparatuses in FIG. 2 are merely illustrative. Any number of head-mounted display apparatuses, any number of touch devices, and any number of manned terminal apparatuses may be provided according to implementation requirements.

Figure 3:
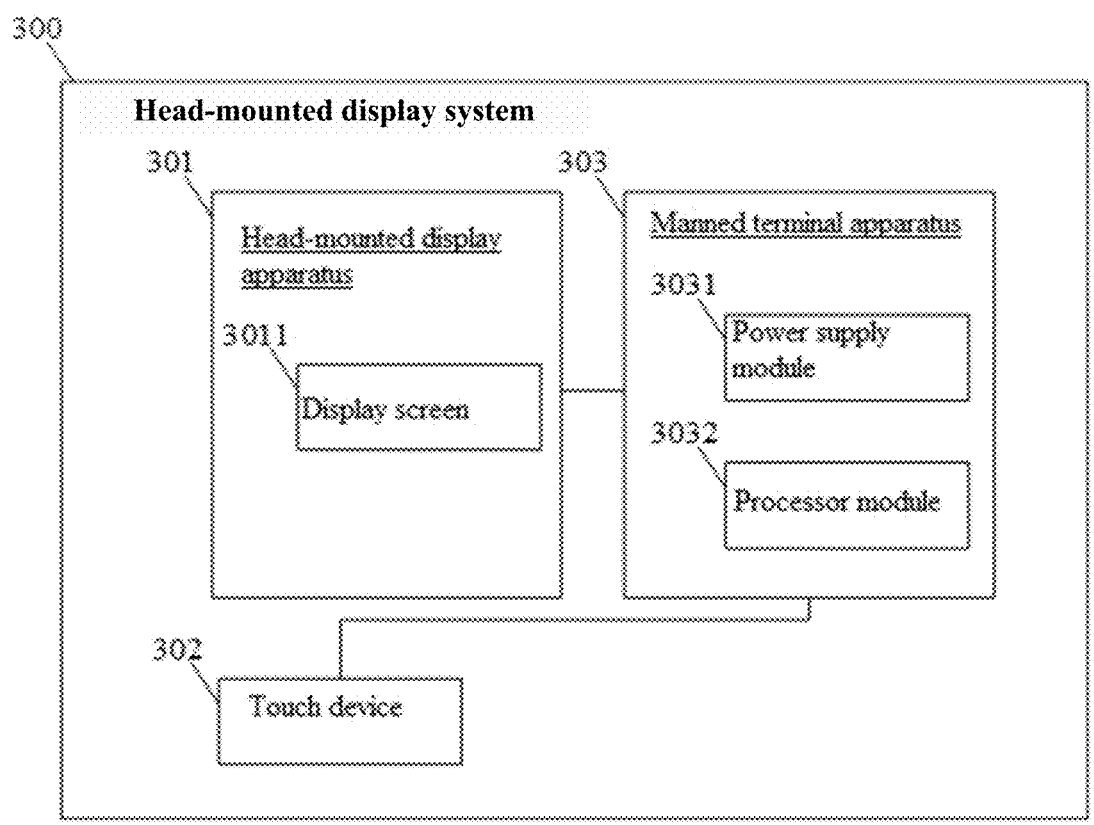
FIG. 3 is a schematic structural diagram of a head-mounted display system according to some embodiments of the present disclosure.

With continued reference to FIG. 3, it is a schematic structural diagram of a head-mounted display system according to some embodiments of the present disclosure. The head-mounted display system 300 includes a head-mounted display apparatus 301, a touch device 302 and a manned terminal apparatus 303.

In some embodiments, the touch device 302 may be arranged on a manned device and be in communication connection with the manned terminal apparatus 303. The touch device 302 may be a device that is used for a user (e.g., a passenger user and/or a driver user) riding the manned device to control the head-mounted display apparatus 301 by means of a touch operation. For example, the touch device 302 may be a touch pad. As another example, the touch device 302 may also be a touch-sensitive display screen. The manner of communication connection between the touch device 302 and the manned terminal apparatus 303 may be wired connection or wireless connection. For example, the manner of communication connection between the touch device 302 and the manned terminal apparatus 303 may be Bluetooth connection. The manned device may be a device for carrying passengers. For example, the manned device may be one of, but not limited to the following vehicles: an automobile, a bus, a G-series high-speed train, an airplane, and a ship.

In some embodiments, the manned terminal apparatus 303 may be arranged on the manned device and includes a power supply module 3031 and a processor module 3032, wherein the manned terminal apparatus 303 may be a terminal apparatus arranged on the manned device. For example, the manned terminal apparatus 303 may be a vehicle-mounted terminal apparatus. The power supply module 3031 may be at least a module for supplying power to the manned terminal apparatus 303 and the touch device 302. The power supply module 3031 may also supply power to the head-mounted display apparatus 301. The processor module 3032 may be a module for performing information processing and program running.

In some embodiments, the head-mounted display apparatus 301 may include at least one display screen 3011. The at least one display screen 3011 is used for imaging in front of the passenger user wearing the head-mounted display apparatus 301. The head-mounted display apparatus 301 may be in communication connection with the manned terminal apparatus 303. The head-mounted display apparatus 301 may be configured to execute a control operation corresponding to a touch operation performed on the touch device 302 by the passenger user of the manned device. The head-mounted display apparatus 301 may be a device for a user (e.g., a passenger user and/or a driver user) riding the manned device to wear so as to watch a virtual scene. Such head-mounted display apparatuses may include, but are not limited to, a head-mounted augmented display apparatus or a head-mounted hybrid display apparatus. For example, the head-mounted augmented display apparatus may be AR glasses. The head-mounted hybrid display apparatus may be MR glasses. The manner of communication connection between the head-mounted display apparatus 301 and the manned terminal apparatus 303 may be wireless connection. For example, the manner of communication connection between the head-mounted display apparatus 301 and the manned terminal apparatus 303 may be Bluetooth connection. The touch operation may be, but is not limited to, click, slide, and drag. The control operation may be an operation of controlling the head-mounted display apparatus 301. For example, when the touch operation is an operation of clicking an application icon, the control operation may be an operation of opening an application interface corresponding to the application icon.

Optionally, a processing unit and/or a memory may be arranged in the head-mounted display apparatus 301.

Optionally, the manned terminal apparatus 303 may be configured to adjust, in response to detecting that the passenger user wears the head-mounted display apparatus 301, a manned seat associated with the head-mounted display apparatus 301 to a preset inclination angle and/or to a horizontal displacement. A distance sensor may be arranged on the head-mounted display apparatus 301. The manned terminal apparatus 303 may determine, in response to the distance detected by the distance sensor being smaller than or equal to a preset distance, that the passenger user wears the head-mounted display apparatus 301. The distance sensor may be used to detect a distance between the head-mounted display apparatus 301 and the face of the passenger user. For example, the distance sensor may be arranged on an inner side of the head-mounted display apparatus 301. The manned seat may be a seat for the passenger user wearing the head-mounted display apparatus 301 to sit in the manned device. The manned terminal apparatus 303 may control a backrest of the manned seat or the manned seat to be adjusted to a preset inclination angle, and/or control the manned seat to be adjusted to a preset horizontal displacement. It can be understood that the backrest of the manned seat or the manned seat may be adjusted to the inclination angle by means of a rotating shaft. The horizontal displacement of the manned seat may be adjusted by means of a slide rail. The specific settings of the rotating shaft and the sliding rail are not limited. Furthermore, the specific settings of the preset inclination angle and the horizontal displacement are not limited. Thus, when the passenger user wears the head-mounted display apparatus, the inclination angle and/or the horizontal displacement of the passenger seat on which the passenger user sits can be automatically adjusted, such that the passenger user can watch the display content in the head-mounted display apparatus in a comfortable posture.

Optionally, the touch device 302 may be arranged on an armrest associated with the head-mounted display apparatus 301. The armrest may be an armrest on one side of the manned seat for the passenger user wearing the head-mounted display apparatus 301 to sit. For example, the touch device 302 may be arranged on the armrest.

Figure 4:
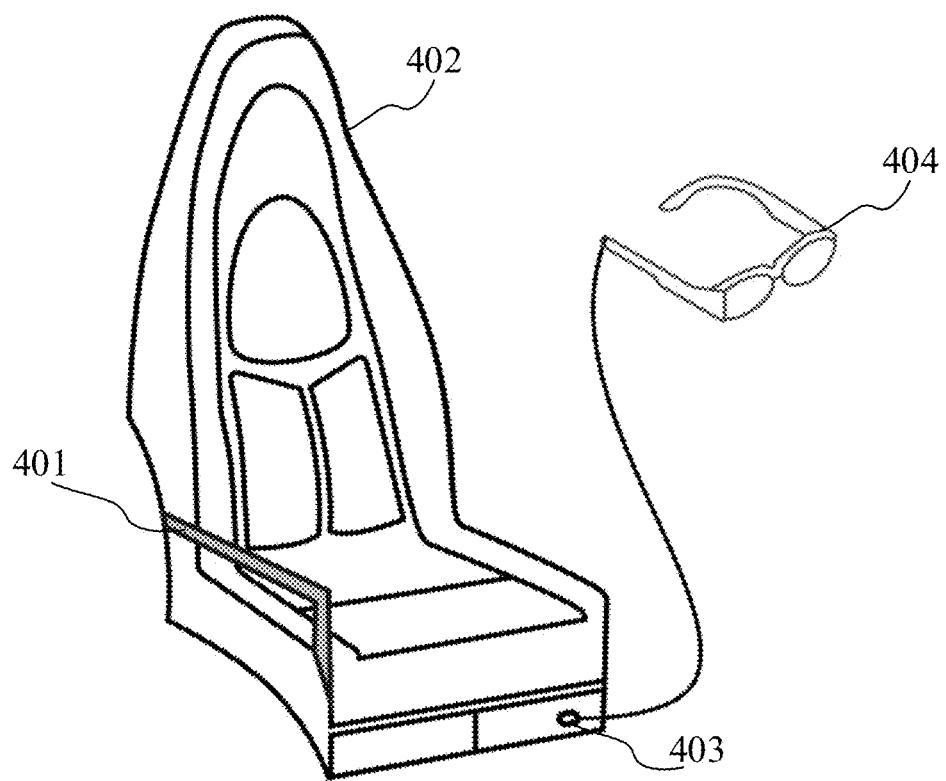
FIGS. 4 and 5 are schematic diagrams of an application scenario for a touch device of a head-mounted display system according to some embodiments of the present disclosure.
Figure 5:
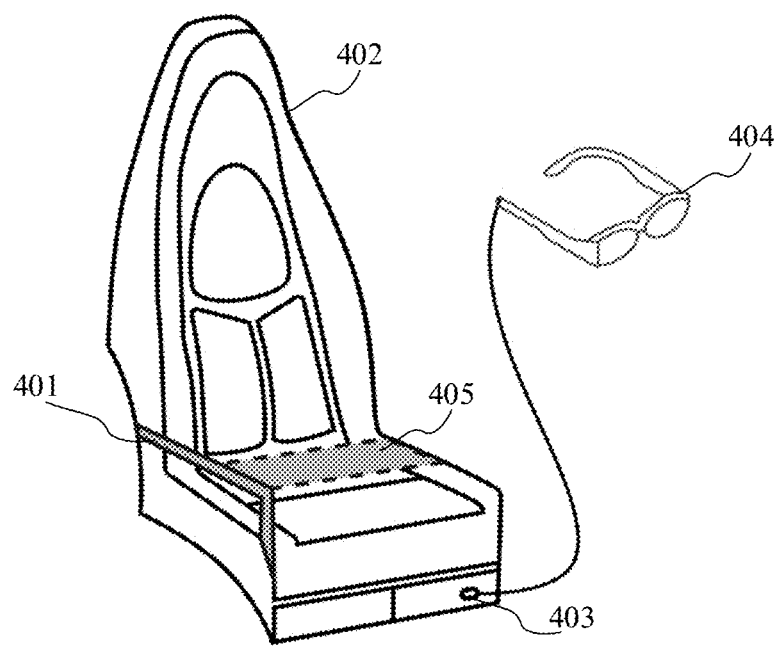

Optionally, a cavity may be formed in the armrest. A rotating shaft may be arranged in the cavity. The touch device 302 may be rotatably connected to the rotating shaft. In an unused state, the touch device 302 may be rotatably arranged in the cavity by means of the rotating shaft. As an example, as shown in FIG. 4, the touch device is in the cavity of the armrest 401 (the touch device and the cavity are not shown in the figure due to the fact that a viewing angle is blocked). A display output interface 403 is arranged at the bottom of the manned seat 402. The head-mounted display apparatus 404 may be connected to the display output interface 403 by means of a connecting wire, such that it is connected to a manned terminal apparatus (not shown in the figure) in the manner of wired connection. When the passenger user sitting on the manned seat 402 needs to control the head-mounted display apparatus 404 by using the touch device 405, the touch device 405 may be pulled out from the cavity of the armrest 401, as shown in FIG. 5. Thus, the passenger user can push the touch device into the cavity of the armrest when the touch device is not used, and the passenger user can pull the touch device out of the cavity when the touch device is used.

Optionally, the manned terminal apparatus 303 may further include a display output interface. The display output interface may be an interface for connection with an apparatus to output data. For example, the display output interface may be a DisplayPort in the form of a USB. Such output data may include, but are not limited to, at least one of the following: audios, videos, and images. The head-mounted display apparatus 301 may further include a display input interface corresponding to the display output interface. The display input interface may be an interface for receiving data output by the manned terminal apparatus 303 by means of the display output interface. For example, the display input interface may be a DisplayPort in the form of type C. Thus, the head-mounted display apparatus and the manned terminal apparatus may be in communication connection in the manner of wired connection.

Figure 6:
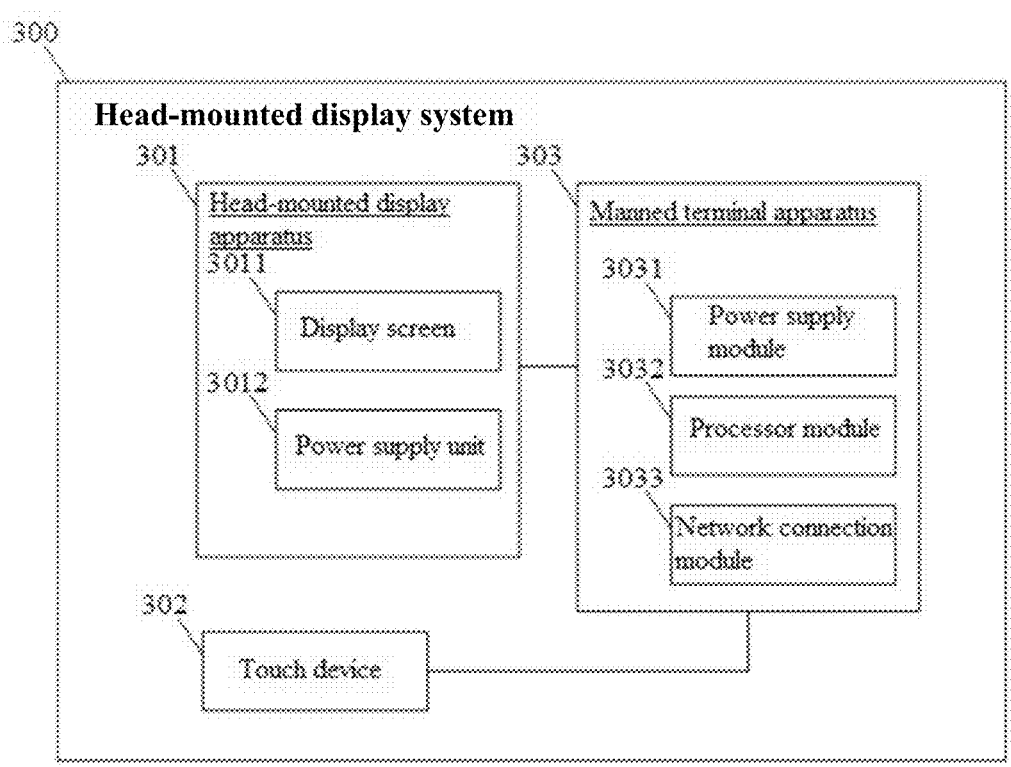
FIGS. 6-9 are schematic structural diagrams of a head-mounted display system according to other embodiments of the present disclosure.

Optionally, as shown in FIG. 6, the manned terminal apparatus 303 may further include a network connection module 3033. The head-mounted display apparatus 301 may further include a power supply unit 3012. The network connection module 3033 may be used for connection with other apparatuses or devices via a wireless network. For example, the manned terminal apparatus 303 may be in communication connection with the head-mounted display apparatus 301 and the touch device 302 respectively via the wireless network. Thus, the manned terminal apparatus may be in communication connection with the head-mounted display apparatus and the touch device in a manner of wireless network connection.

The power supply unit 3012 may supply power to the head-mounted display apparatus 301. Thus, power can be supplied by the power supply unit of the head-mounted display apparatus itself when the head-mounted display apparatus is wirelessly connected to the manned terminal apparatus.

Optionally, the manner of connection between the head-mounted display apparatus 301 and the manned terminal apparatus 303 is wireless connection for projection. Thus, the head-mounted display apparatus can be in communication connection, when being provided with the power supply unit, with the manned terminal apparatus in the manner of wireless connection for projection.

Figure 7:
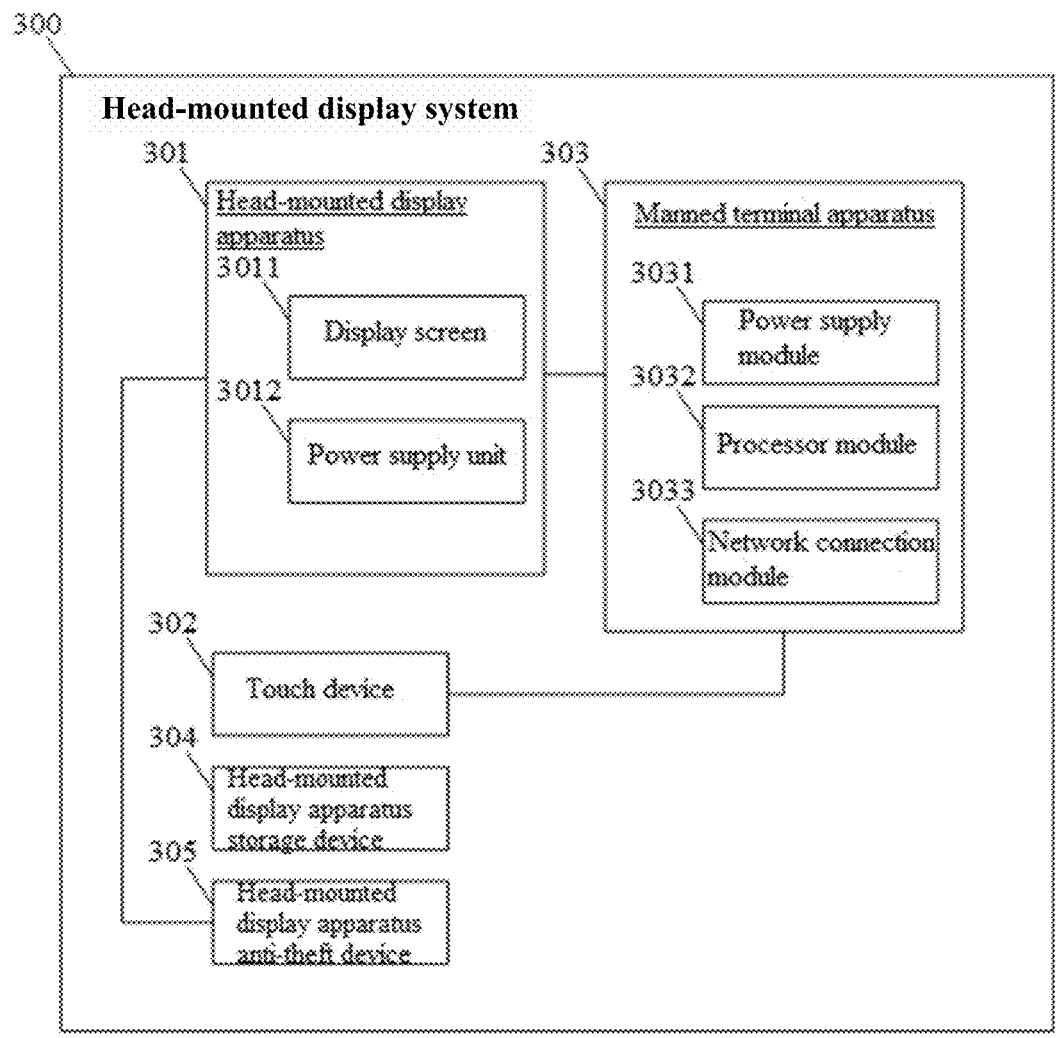

Optionally, as shown in FIG. 7, the head-mounted display system may further include a head-mounted display apparatus storage device 304 and a head-mounted display apparatus anti-theft device 305. The head-mounted display apparatus anti-theft device 305 may include an alarm and a communication connection detection module (not shown in figure).

The head-mounted display apparatus storage device 304 may be a device for storing the head-mounted display apparatus 301. For example, the head-mounted display apparatus storage device 304 may be a box for storing the head-mounted display apparatus 301. In the unused state, the head-mounted display apparatus 301 is placed in the head-mounted display apparatus storage device 304. Thus, the head-mounted display apparatus may be stored with the head-mounted display apparatus storage device.

The head-mounted display apparatus anti-theft device 305 may be in communication connection with the head-mounted display apparatus 301. The head-mounted display apparatus anti-theft device 305 may be a device for monitoring a storage state of the head-mounted display apparatus 301. The communication connection detection module may be a module for detecting a communication connection state of the head-mounted display apparatus anti-theft device 305 and the head-mounted display apparatus 301. The storage state may be a state indicating whether the head-mounted display apparatus 301 is taken away by a person. For example, when the head-mounted display apparatus anti-theft device 305 is connected to the head-mounted display apparatus 301 in a wired manner, if the communication connection detection module detects that the wired connection is disenabled, the storage state may be a state indicating that the head-mounted display apparatus 301 is taken away by the person. For another example, when the head-mounted display apparatus anti-theft device 305 is connected to the head-mounted display apparatus 301 in a wireless manner, if the communication connection detection module detects wireless disconnection, the storage state may be a state indicating that the head-mounted display apparatus 301 is taken away by the person. The communication connection detection module may be configured to activate the alarm in response to detecting the communication disconnection with the head-mounted display apparatus. The communication connection detection module may determine, in response to detecting the wired disconnection with the head-mounted display apparatus 301, the communication disconnection with the head-mounted display apparatus. The communication connection detection module may also determine, in response to detecting the wireless disconnection with the head-mounted display apparatus 301, the communication disconnection with the head-mounted display apparatus. The alarm can produce, after activated, preset warning sound and/or preset warning light. Thus, the number of lost head-mounted display apparatuses may be decreased by means of the head-mounted display apparatus anti-theft device.

Figure 8:
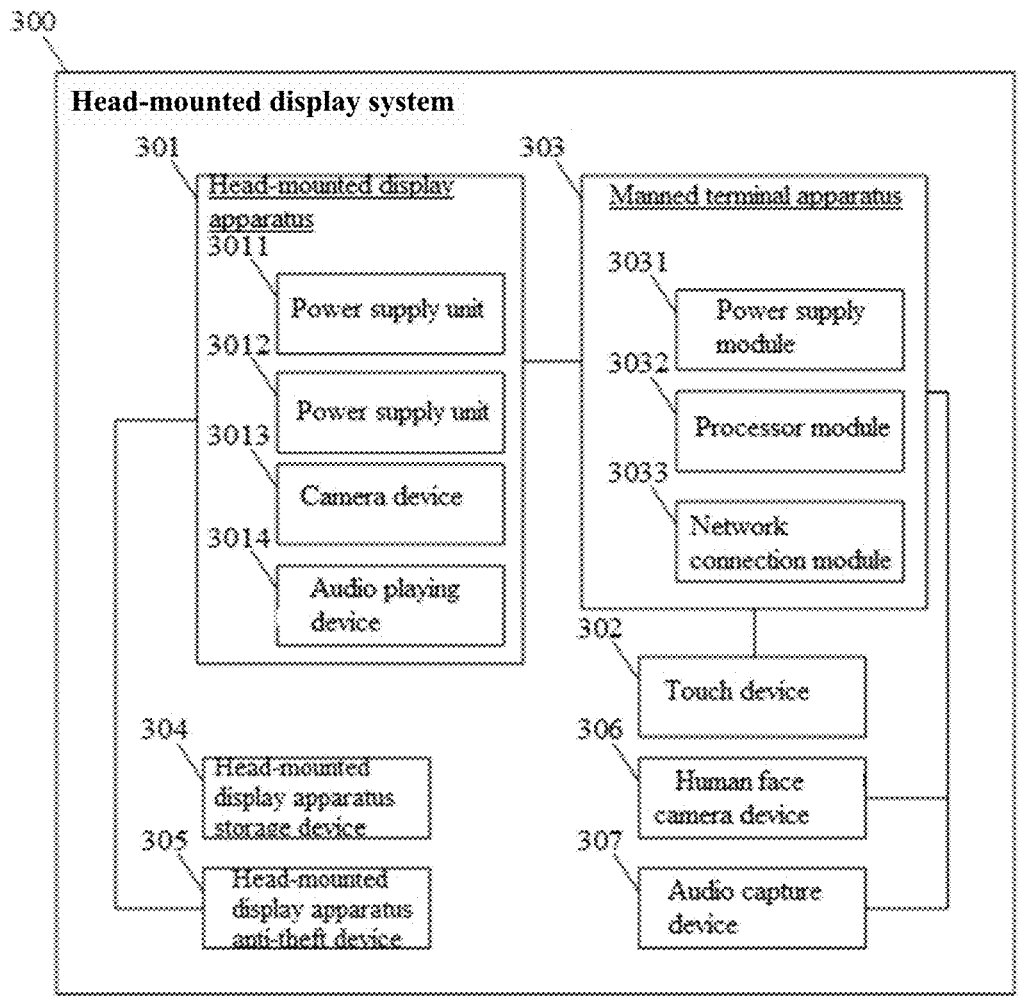

Optionally, as shown in FIG. 8, the head-mounted display apparatus 301 may further include a camera device 3013 and an audio playing device 3014. The head-mounted display system may further include a human face camera device 306 and an audio capture device 307. The camera device 3013 may be a device arranged on the head-mounted display apparatus 301 to photograph a surrounding environment. For example, the camera device 3013 may be a camera arranged on the head-mounted display apparatus 301. The audio playing device 3014 may be a device for playing audios. For example, the audio playing device 3014 may be a loudspeaker arranged on the head-mounted display apparatus 301. The human face camera device 306 may be a device for photographing at least the face of the user wearing the head-mounted display apparatus 301. For example, the human face camera device 306 may be a camera arranged in front (e.g., the outer side of a backrest of a front seat) of the user wearing the head-mounted display apparatus 301. The audio capture device 307 may be a device for capturing audios. For example, the audio capture device 307 may be a microphone. The audio capture device 307 may be arranged on the head-mounted display apparatus 301.

The head-mounted display apparatus 301 is further configured to: identify at least one piece of manned device characteristic location information from a manned device image captured by the camera device 3013, and configured to display, with regard to each piece of manned device characteristic location information in the at least one piece of manned device characteristic location information, manned device characteristic prompt message corresponding to the manned device characteristic location information, at the location corresponding to the manned device characteristic location information in the virtual space displayed by the at least one display screen 3011. The manned device image may be an image of the manned device captured by the camera device 3013. The manned device characteristic location information may be localization information in the manned device, representing characteristics in the manned device image. The characteristics may be specific components of the manned device and may include, but are not limited to at least one of the following: a window, a safety hammer, various function buttons, a safety belt, a steering wheel, a central console and a display screen. The function buttons may be buttons on the manned device, such as window adjustment buttons. The head-mounted display apparatus 301 may identify the manned device characteristic location information by means of a simultaneous localization and mapping (SLAM) algorithm. The manned device characteristic prompt message may be prompt message related to a characteristic corresponding to the manned device characteristic location information. The manned device characteristic prompt message may be presented in the forms that include, but are not limited to, at least one of the following: a text, an image, a video, and a link control. The link control may be a control for skipping to other pages. For example, when the characteristic is a window adjustment button, the corresponding manned device characteristic prompt message may be a message for prompting how to adjust a window, for example, "the window may rise by lifting the button, and may fall by pressing the button". Thus, the user wearing the head-mounted display apparatus can watch the prompt message for explaining respective characteristics at the locations corresponding to the respective characteristics of the manned device in the virtual space.

The human face camera device 306 may be configured to capture a face image of the passenger user wearing the head-mounted display apparatus 301. The head-mounted display apparatus 301 may be further configured to display the human face image captured by the human face camera device 306 in the virtual space displayed by the at least one display screen 3011. The human face camera device 306 may be further configured to capture a human face video of the passenger user wearing the head-mounted display apparatus 301. The audio capture device 307 may be configured to capture an audio corresponding to the human face video. It may be understood that the audio is captured synchronously with the human face video. Thus, the audio/video may be captured by the human face camera device and the audio capture device.

Figure 9:
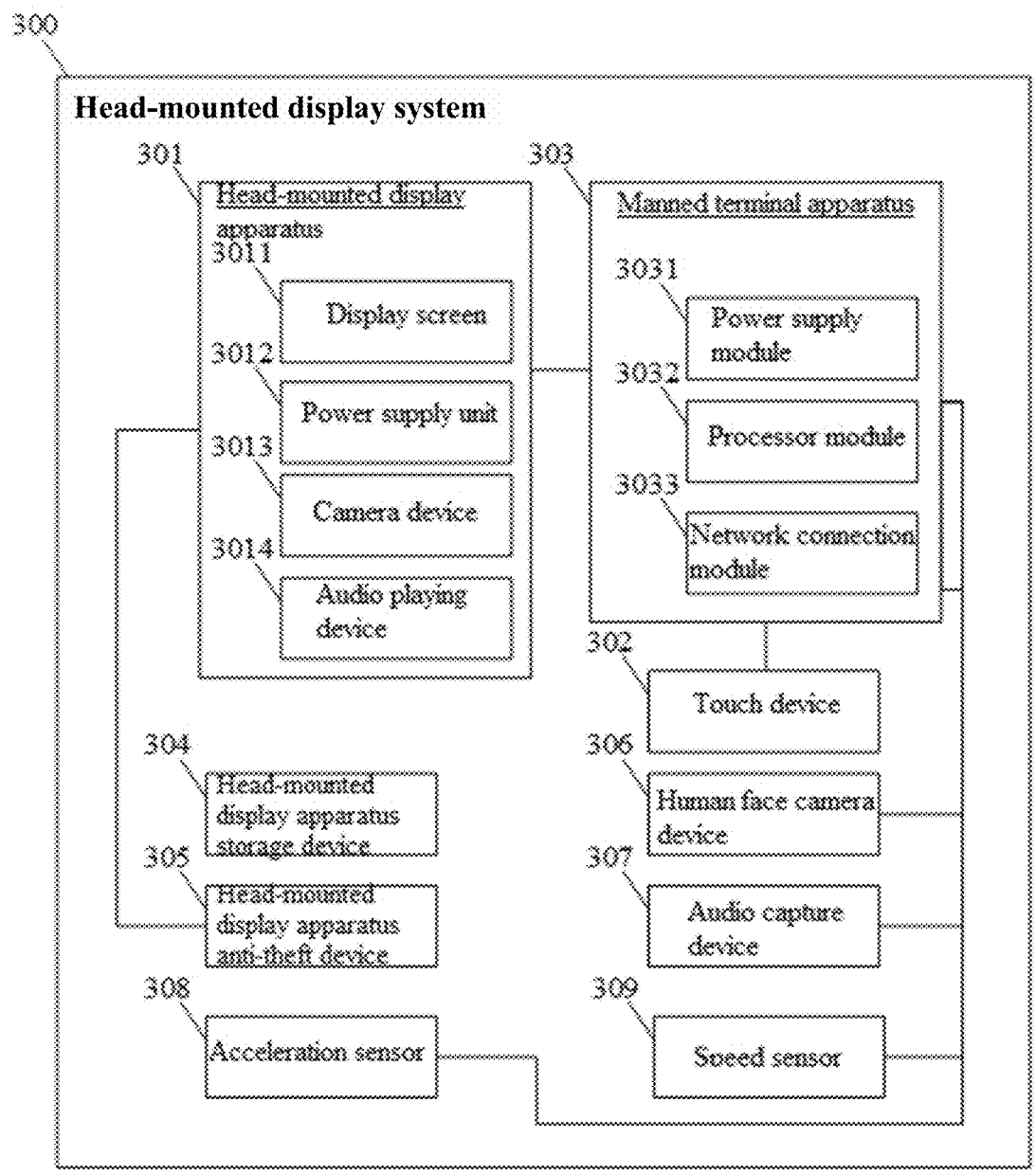

Optionally, as shown in FIG. 9, the head-mounted display system may further include an acceleration sensor 308 and a speed sensor 309, wherein the acceleration sensor 308 may be an acceleration sensor arranged in the head-mounted display apparatus 301. The acceleration sensor 308 may also be an acceleration sensor arranged in the manned terminal apparatus 303. The speed sensor 309 may be a speed sensor arranged in the head-mounted display apparatus 301. The speed sensor 309 may also be a speed sensor arranged in the manned terminal apparatus 303.

The head-mounted display apparatus 301 may be further configured to display, in response to the acceleration acquired by the acceleration sensor 308 satisfying one of at least one acceleration prompt condition, an acceleration prompt message corresponding to the acceleration prompt condition in the virtual space displayed by the at least one display screen, wherein the at least one acceleration prompt condition may include, but is not limited to, any one of the following: the acceleration is greater than or equal to an acceleration prompt threshold, the acceleration is smaller than or equal to a deceleration prompt threshold, and the acceleration is 0. The specific settings of the acceleration prompt threshold and the deceleration prompt threshold are not limited herein. The acceleration prompt message may be used for prompting information related to the acceleration. The acceleration prompt message may be presented in the forms that include, but are not limited to, at least one of the following: a text, and an image. For example, when the acceleration prompt condition is "the acceleration is greater than or equal to the acceleration prompt threshold", the acceleration prompt message may be "please note that the vehicle is accelerating". When the acceleration prompt condition is "the acceleration is smaller than or equal to the deceleration prompt threshold", the acceleration prompt message may be "please note that the vehicle is decelerating". When the acceleration prompt condition is "the acceleration is 0", the acceleration prompt message may be "the vehicle is running smoothly". Thus, a running state may be prompted in the virtual space by means of the acceleration acquired by the acceleration sensor.

The head-mounted display apparatus 301 may be further configured to display, in response to the speed acquired by the speed sensor 309 satisfying one of at least one speed prompt condition, a speed prompt message corresponding to the speed prompt condition in the virtual space displayed by the at least one display screen, wherein the at least one speed prompt condition may include, but is not limited to, any one of the following condition: the speed is greater than or equal to a high speed prompt threshold, and the speed is smaller than or equal to a low speed prompt threshold. The specific settings of the high speed prompt threshold and the low speed prompt threshold are not limited herein. The speed prompt message may be used for prompting information related to the speed. The speed prompt message may include a speed. The speed prompt message may be presented in the forms that include, but are not limited to, at least one of the following: a text, and an image. For example, when the speed is 140 km/h and the speed prompt condition is "the speed is greater than or equal to the high speed prompt threshold", the speed prompt message may be "please note that the current speed is 140 km/h and the vehicle is running at a high speed". When the speed is 30 km/h and the speed prompt condition is "the speed is smaller than or equal to the low speed prompt threshold", the speed prompt message may be "the current speed is 30 km/h and the vehicle is running at a low speed". Thus, a running speed may be prompted in the virtual space by means of the speed acquired by the speed sensor.

Optionally, the head-mounted display apparatus 301 may be further configured to display the user interaction interface of the manned terminal apparatus 303 in the virtual space displayed by the at least one display screen 3011, wherein the user interaction interface may be an application interface of the manned terminal apparatus 303. For example, the user interaction interface may be an application interface of a local application on the manned terminal apparatus 303. As another example, the user interaction interface may be an application interface of an application (e.g., an office application, an audio-video application, a game application, etc.) installed on the manned terminal apparatus 303 by means of an installation package. It should be noted that each of a plurality of head-mounted display apparatuses 301 may separately display the user interaction interface of the manned terminal apparatus 303. Thus, the user can watch the user interaction interface of the manned terminal apparatus by means of the head-mounted display apparatus.

Optionally, the head-mounted display system may further include a localization device. The localization device may be a device for localization arranged on the manned terminal apparatus 303 or the head-mounted display apparatus 301. For example, the localization device may be a GPS localization device. The localization device may be configured to capture localization information. The localization information may be the latitude and longitude of a current location.

Optionally, the head-mounted display apparatus 301 may be further configured to display road condition information and/or weather information corresponding to the localization information in the virtual space displayed by the at least one display screen 3011, wherein the road condition information may be road condition related information about a location corresponding to the localization information, and may be used for representing a road traffic circulation state. The road traffic circulation state may include, but is not limited to, at least one of the following: a road congestion state and traffic accident information. The traffic accident information may include, but is not limited to, at least one of the following: a traffic accident, road damage, and road closure for diversion. The weather information may be weather related information about a location corresponding to the localization information. Thus, the user wearing the head-mounted display apparatus can watch the road condition information and/or the weather information of the current location in the virtual space.

Optionally, the head-mounted display apparatus 301 may be further configured to display travel recommendation information corresponding to the localization information in the virtual space displayed by the at least one display screen 3011, wherein the travel recommendation information may be recommendation information related to the location corresponding to the localization information. For example, the travel recommendation information may include, but is not limited to, at least one of the following: scenic spot information, celebrity information, and special snack information. Thus, the user wearing the head-mounted display apparatus can watch the travel recommendation information of the current location in the virtual space.

Optionally, the head-mounted display apparatus 301 may be further configured to display destination road condition information of a corresponding destination in the virtual space displayed by the at least one display screen 3011, wherein the destination may be a destination to which the manned device corresponding to the manned terminal apparatus 303 will run. The destination may also be a destination that the user wearing the head-mounted display apparatus 301 needs to reach. The destination road condition information may be traffic circulation state information about the destination. Thus, the user wearing the head-mounted display apparatus can watch the destination road condition information about the destination in the virtual space.

Optionally, the head-mounted display apparatus 301 may be further configured to display multimedia information corresponding to the remaining riding time in the virtual space displayed by the at least one display screen 3011, wherein the remaining riding time may be a remaining time required for the user wearing the head-mounted display apparatus 301 to reach the destination. The remaining riding time may be obtained by the head-mounted display apparatus 301 from a navigation system of the manned terminal apparatus 303. The multimedia information may be information in a multimedia form corresponding to the remaining riding time. The multimedia information may include, but is not limited to, at least one of the following: an image, a video, an audio, and a game. The corresponding relationship between the multimedia information and the remaining riding time may include, but is not limited to: the playing duration of the multimedia information is shorter than or equal to the remaining riding time, and the applicable duration of the multimedia information is shorter than or equal to the remaining riding time. The applicable duration may be the duration during which the user usually watches the multimedia information or performs interaction according to the multimedia information, may be understood as the average duration during which each user watches the multimedia information or performs interaction according to the multimedia information, and may also be understood as the duration with the maximum number of repetitions in the durations during which each user watches the multimedia information or performs interaction according to the multimedia information. Thus, the multimedia information corresponding to the remaining riding time may be recommended for the user wearing the head-mounted display apparatus such that the user can watch the recommended multimedia information in the virtual space.

Optionally, the head-mounted display apparatus 301 may be further configured to display, in response to detecting that an operating mode is an online mode, an online virtual interface in the virtual space displayed by the at least one display screen, wherein the operating mode may be a mode adopted by the system when the head-mounted display apparatus 301 operates. The operating mode may include, but is not limited to, one of the following: a stand-alone mode, and an online mode. The stand-alone mode may be a mode in which the head-mounted display apparatus 301 operates separately. The online mode may be a mode in which the head-mounted display apparatus 301 operates online with other head-mounted display apparatuses. The online virtual interface may be an interface corresponding to a virtual interface displayed in other head-mounted display apparatuses that are online. The online virtual interface may be the same as the virtual interface displayed in other online head-mounted display apparatuses, or may be an interface with a viewing angle of the user switched with regard to the virtual interface. For example, the online virtual interface may be an audio/video playing interface or a game interface. The audio/video playing interface may be a video viewing interface or a song recording interface. Thus, when the head-mounted display apparatus is in the online mode, the user wearing the head-mounted display apparatus can watch the online virtual interface in the virtual space.

It should be noted that the numbers of the head-mounted display apparatuses 301, the touch devices 302 and the manned terminal apparatuses 303 included in the head-mounted display system of some embodiments of the present disclosure are not limited.

For example, the head-mounted display system may include: one manned terminal apparatus 303, N head-mounted display apparatuses 301, and N touch devices 302, wherein N represents any positive integer. The N head-mounted display apparatuses 301 and the N touch devices 302 may be respectively in communication connection with the one manned terminal apparatus 303. Each head-mounted display apparatus 301 in the N head-mounted display apparatuses 301 may correspond to the respective touch device 302 in the N touch devices 302 on a one-to-one basis.

As another example, the head-mounted display system may include: M manned terminal apparatuses 303, M head-mounted display apparatuses 301, and M touch devices 302, wherein M represents any positive integer. Each manned terminal apparatus 303 in the M manned terminal apparatuses 303 may correspond to the respective head-mounted display apparatus 301 in the M head-mounted display apparatuses 301 on a one-to-one basis. Each manned terminal apparatus 303 in the M manned terminal apparatuses 303 may correspond to the respective touch device 302 in the M touch devices 302 on a one-to-one basis. Each head-mounted display apparatus 301 in the M head-mounted display apparatuses 301 may correspond to the respective touch device 302 in the M touch devices 302 on a one-to-one basis. Each manned terminal apparatus 303 in the M manned terminal apparatuses 303 may be in communication connection with the corresponding touch device 302 and head-mounted display apparatus 301.

As another example, the head-mounted display system may include: X manned terminal apparatuses 303, Y head-mounted display apparatuses 301, and Y touch devices 302, wherein X and Y represent any positive integer, and X may be less than Y. Each manned terminal apparatus 303 in the X manned terminal apparatuses 303 may be in communication connection with at least one head-mounted display apparatus 301. Each manned terminal device 303 in the X manned terminal apparatuses 303 may be in communication connection with at least one touch device 302. Each head-mounted display apparatus 301 in the Y head-mounted display apparatuses 301 may correspond to the respective touch device 302 in the Y touch devices 302 on a one-to-one basis.

The above-described embodiments of the present disclosure have the following beneficial effects that the head-mounted display system of some embodiments of the present disclosure allow the passenger to watch screen content without maintaining a certain posture for a long time, and the personalized experience and privacy experience of the passengers are improved. Specifically, a passenger needs to maintain a certain viewing posture for a long time and the personalized experience and privacy experience of the passenger are poor due to the fact that: since the display screen is arranged at a fixed position of the manned device, the passenger needs to maintain a certain viewing posture for a long time when watching, for example, the passenger sitting on one side of the display screen needs to watch in a posture of turning his/her head sideways; also, the passenger watching the same display screen cannot optionally switch the display content of the display screen according to his/her own demands, causing the personalized experience of the passenger to be poor; moreover, sharing the display content of the display screen makes the privacy experience of the passenger poor. On this basis, the head-mounted display system of some embodiments of the present disclosure includes a head-mounted display apparatus, a touch device and a manned terminal apparatus, wherein the touch device is in communication connection with the manned terminal apparatus, the manned terminal apparatus includes a power supply module and a processor module, the head-mounted display apparatus includes at least one display screen, the head-mounted display apparatus is in communication connection with the manned terminal apparatus, and the head-mounted display apparatus is configured to execute a control operation corresponding to a touch operation performed on the touch device by a passenger user. Thus, the passenger can control the worn head-mounted display apparatus by himself/herself by means of the touch device, improving the personalized experience of the passenger. Also, since the head-mounted display apparatus comprises at least one display screen, the passenger can watch the display content directly by means of the head-mounted display apparatus, and accordingly can watch it without a display screen configured on the manned device. Furthermore, it is not required to maintain a certain viewing posture for a long time, and the privacy experience of the passenger is also improved. Thus, the passenger can watch the screen content without maintaining a certain posture for a long time, and the personalized experience and privacy experience of the passenger are improved.

Figure 10:
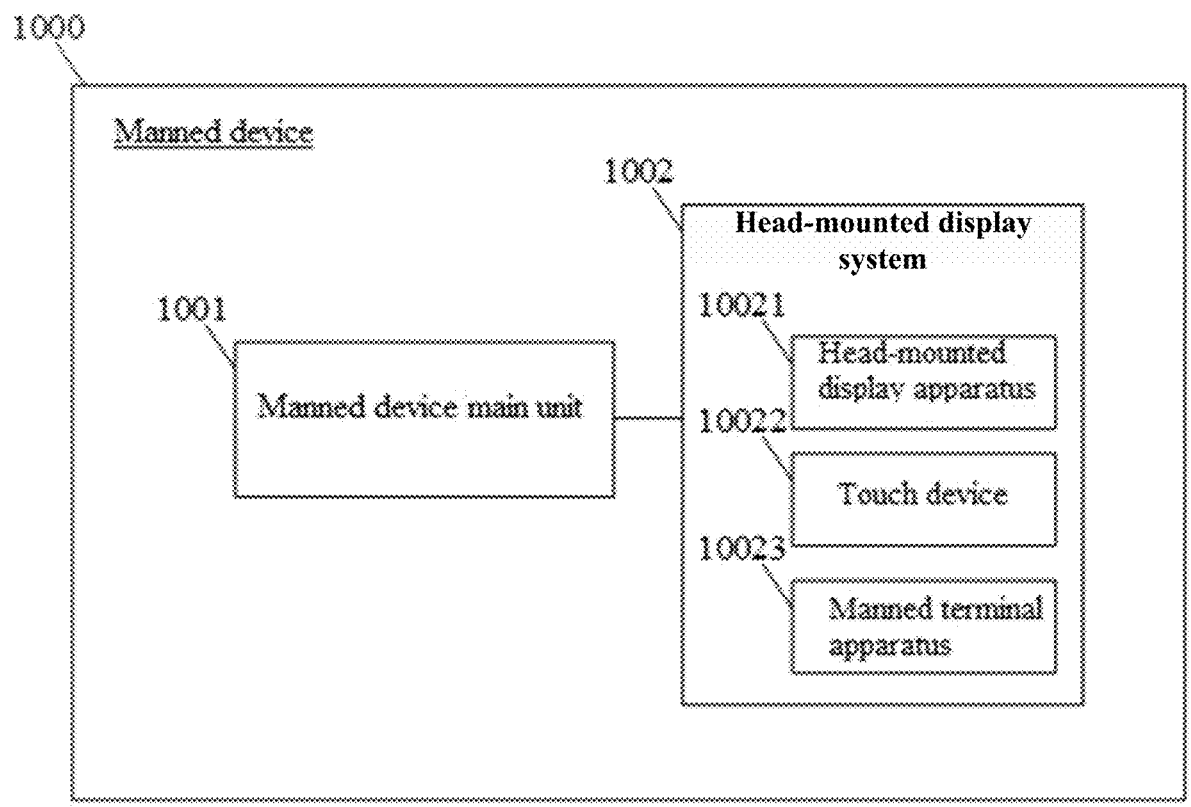
FIGS. 10 and 11 are schematic structural diagrams of a manned device according to some embodiments of the present disclosure.

With further reference to FIG. 10, a schematic structural diagram of a manned device according to some embodiments of the present disclosure is illustrated. The manned device 1000 includes a manned device main unit 1001 and a head-mounted display system 1002. The head-mounted display system 1002 may include a head-mounted display apparatus 10021, a touch device 10022, and a manned terminal apparatus 10023. The manned device main unit 1001 may be a device for carrying passengers, and may include, but is not limited to, an automobile, a bus, a G-series high-speed train, an airplane, and a ship. The specific implementation of the head-mounted display system 1002 may refer to the head-mounted display system described with reference to any one of the implementations in FIG. 3 or FIGS. 6-9 and will not be repeated herein.

Figure 11:
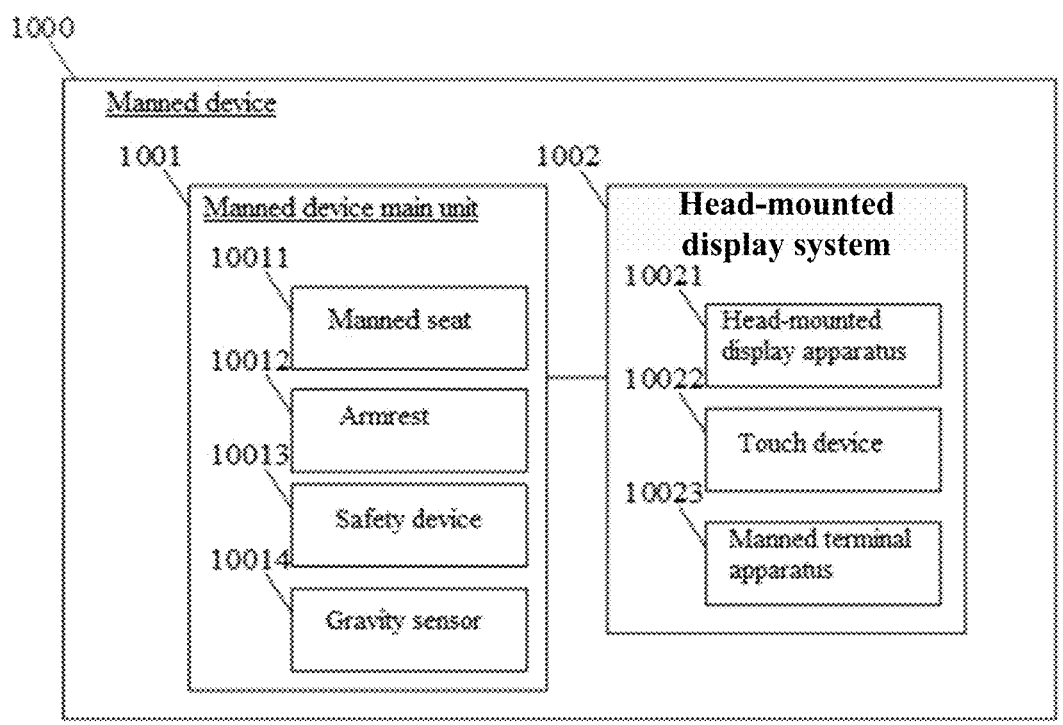

Optionally, as shown in FIG. 11, the manned device main unit 1001 may further include a manned seat 10011, an armrest 10012, a safety device 10013, and a gravity sensor 10014, wherein the touch device 10022 may be arranged on the manned seat 10011, and the manned seat 10011 may be a seat in front of the passenger user wearing the head-mounted display apparatus 10021. The touch device 10022 may be arranged on the outer side of a backrest of the manned seat 10011. Thus, a touch plane of the touch device 10022 may face the passenger user wearing the head-mounted display apparatus 10021.

The manned seat 10011 may be a passenger seat. The passenger seat may be a seat for the passenger user wearing the head-mounted display apparatus 10021 to sit. The armrest 10012 may be arranged on one side of the passenger seat. For example, the armrest 10012 may be arranged on the right-hand side of the passenger user. The touch device 10022 may be arranged on the armrest 10012. Thus, the passenger user can control the head-mounted display apparatus by means of the touch device on the armrest.

The passenger seat may include the safety device 10013. The safety device 10013 may be a device for protecting the passenger. For example, the safety device 10013 may be a seat belt device. The head-mounted display apparatus 10021 may be configured to display, in response to detecting that the safety device 10013 of the passenger seat is in a standby state, safety prompt message corresponding to the safety device 10013 in the virtual space displayed by at least one display screen of the head-mounted display apparatus 10021, wherein when the safety device 10013 is in a standby state, it can be indicated that there is no protection for the passenger. For example, when the safety device 10013 is in the standby state, it can be indicated that a seat belt of the passenger seat is not fastened. The safety prompt message may be a message for prompting the passenger to use the safety device 10013. For example, the safety prompt message may be "please fasten the safety belt". Thus, when the safety device is in the standby state, the passenger user can be prompted for safety protection by means of the head-mounted display apparatus.

A gravity sensor 10014 may be arranged below the passenger seat. The manned terminal apparatus 10023 may be configured to, in response to the gravity information detected by the gravity sensor 10014, turn on the touch device 10022 and the head-mounted display apparatus 10021. The gravity information may be the gravity detected by the gravity sensor 10014. Thus, it is possible to automatically turn on the touch device and the head-mounted display apparatus when the passenger seat bears a weight, such that the touch device and the head-mounted display apparatus are in a directly usable state.

The manned terminal apparatus 10023 may be further configured to, in response to detecting a weight release message by means of the gravity sensor 10014, turn off the touch device 10022 and the head-mounted display apparatus 10021 after a preset time interval. The weight release message may be a message indicating that the passenger seat releases the weight or does not bear the weight. Thus, it is possible to automatically turn off the touch device and the head-mounted display apparatus when the passenger user leaves the seat.

The above-described embodiments of the present disclosure have the following beneficial effects that the manned device of some embodiments of the present disclosure allow the passenger to watch screen content without maintain a certain posture for a long time, and the personalized experience and privacy experience of the passengers are improved. Specifically, a passenger needs to maintain a certain viewing posture for a long time and the personalized experience and privacy experience of the passenger are poor due to the fact that: since the display screen is arranged at a fixed position of the manned device, the passenger needs to maintain a certain viewing posture for a long time when watching, for example, the passenger sitting on one side of the display screen needs to watch in a posture of turning his/her head sideways; also, the passenger watching the same display screen cannot optionally switch the display content of the display screen according to his/her own demands, causing the personalized experience of the passenger to be poor; moreover, sharing the display content of the display screen makes the privacy experience of the passenger poor. On this basis, the manned device of some embodiments of the present disclosure includes a manned device main unit and a head-mounted display system as described in any one of the implementations in FIG. 3 or FIGS. 6-9. Thus, the passenger can control the worn head-mounted display apparatus by himself/herself by means of the touch device, improving the personalized experience of the passenger. Also, since the head-mounted display apparatus comprises at least one display screen, the passenger can watch the display content directly by means of the head-mounted display apparatus, and accordingly can watch it without a display screen configured on the manned device. Furthermore, it is not required to maintain a certain viewing posture for a long time, and the privacy experience of the passenger is also improved. Thus, the passenger can watch the screen content without maintaining a certain posture for a long time, and the personalized experience and privacy experience of the passenger are improved.

The foregoing description only illustrates some of the preferred embodiments of the present disclosure and the technical principles used. It should be understood by those skilled in the art that the scope of the present disclosure covered by the embodiments of the present disclosure is not limited to the technical solution obtained by means of any particular combination of the features described above, but is intended to cover other technical solutions obtained by means of any combination of the features described above or their equivalent features without departing from the concept of the present disclosure. For example, a technical solution obtained by substituting the above-described features with the technical features having similar functions disclosed in (but not limited to) the embodiments of the present disclosure each other.

What is claimed:

1. A head-mounted display system for use in a manned device, comprising: a head-mounted display apparatus, a touch device and a manned terminal apparatus, wherein
the touch device is arranged on the manned device and is in communication connection with the manned terminal apparatus;
the manned terminal apparatus is arranged on the manned device, and comprises a power supply module and a processor module;
the head-mounted display apparatus comprises at least one display screen, the head-mounted display apparatus is in communication connection with the manned terminal apparatus, and the head-mounted display apparatus is configured to execute a control operation corresponding to a touch operation performed on the touch device by a passenger user of the manned device; and
the manned terminal apparatus is configured to adjust, in response to detecting that the passenger user wears the head-mounted display apparatus, a manned seat associated with the head-mounted display apparatus to a preset inclination angle and/or to a preset horizontal displacement.

2. The head-mounted display system according to claim 1, wherein the touch device is arranged on an armrest associated with the head-mounted display apparatus.

3. The head-mounted display system according to claim 2, wherein a cavity is formed in the armrest, a rotating shaft is arranged in the cavity, the touch device is rotatably connected to the rotating shaft, and in an unused state, the touch device is rotatably arranged in the cavity by means of the rotating shaft.

4. The head-mounted display system according to claim 1, wherein the head-mounted display apparatus further comprises a power supply unit.

5. The head-mounted display system according to claim 4, wherein the manner of connection between the head-mounted display apparatus and the manned terminal apparatus is wireless connection for projection.

6. The head-mounted display system according to claim 1, wherein the head-mounted display system further comprises a head-mounted display apparatus storage device, and the head-mounted display apparatus is placed in the head-mounted display apparatus storage device in an unused state.

7. The head-mounted display system according to claim 1, wherein the head-mounted display system further comprises a head-mounted display apparatus anti-theft device.

8. The head-mounted display system according to claim 7, wherein
the head-mounted display apparatus anti-theft device comprises an alarm and a communication connection detection module, and the head-mounted display apparatus anti-theft device is in communication connection with the head-mounted display apparatus; and
the communication connection detection module is configured to activate the alarm in response to detecting that the head-mounted display apparatus anti-theft device is in communication disconnection with the head-mounted display apparatus.

9. The head-mounted display system according to claim 1, wherein
the head-mounted display apparatus further comprises a camera device; and
the head-mounted display apparatus is further configured to identify at least one piece of manned device characteristic location information from a manned device image captured by the camera device, and configured to display, with regard to each piece of manned device characteristic location information in the at least one piece of manned device characteristic location information, manned device characteristic prompt message corresponding to the manned device characteristic location information, at the location corresponding to the manned device characteristic location information in a virtual space displayed by the at least one display screen.

10. The head-mounted display system according to claim 1, wherein
the head-mounted display system further comprises a human face camera device;

the human face camera device is configured to capture a face image of a passenger user wearing the head-mounted display apparatus; and the head-mounted display apparatus is further configured to display the human face image captured by the human face camera device in the virtual space displayed by the at least one display screen.

11. The head-mounted display system according to claim 10, wherein the head-mounted display system further comprises an audio capture device;

the human face camera device is further configured to capture a human face video of the passenger user wearing the head-mounted display apparatus; and the audio capture device is configured to capture an audio corresponding to the human face video.

12. The head-mounted display system according to claim 1, wherein the head-mounted display apparatus further comprises an audio playing device.

13. The head-mounted display system according to claim 1, wherein the head-mounted display system further comprises an acceleration sensor; and the head-mounted display apparatus is further configured to display, in response to the acceleration acquired by the acceleration sensor satisfying one of at least one acceleration prompt condition, an acceleration prompt message corresponding to the acceleration prompt condition in the virtual space displayed by the at least one display screen.

14. The head-mounted display system according to claim 1, wherein the head-mounted display system further comprises a speed sensor; and the head-mounted display apparatus is further configured to display, in response to the speed acquired by the speed sensor satisfying one of at least one speed prompt condition, a speed prompt message corresponding to the speed prompt condition in the virtual space displayed by the at least one display screen.

15. The head-mounted display system according to claim 1, wherein the head-mounted display apparatus is further configured to display a user interaction interface of the manned terminal apparatus in a virtual space displayed by the at least one display screen.

16. The head-mounted display system according to claim 1, wherein the head-mounted display system further comprises a localization device that is configured to capture localization information.

17. The head-mounted display system according to claim 1, wherein the head-mounted display apparatus is further configured to display road condition information and/or weather information corresponding to the localization information in a virtual space displayed by the at least one display screen.

18. The head-mounted display system according to claim 1, wherein the head-mounted display apparatus is further configured to display, in response to detecting that an operating mode is an online mode, an online virtual interface in a virtual space displayed by the at least one display screen.

* * * * *